United States Patent
Kahlon et al.

(12) 
(10) Patent No.: US 6,356,042 B1
(45) Date of Patent: Mar. 12, 2002

(54) ENGINE SHUT OFF SYSTEM FOR A HYBRID ELECTRIC VEHICLE

(76) Inventors: Gurinder S. Kahlon, 1755 Bridgewater Ct., Canton, MI (US) 48124; Ning Liu, 4671 Ash Ct., Ypsilanti, MI (US) 48197; Robert Mohan, 44212 Craftsbury, Canton, MI (US) 48187

( * ) Notice: Subject to any disclaimer, the term of this patent is extended or adjusted under 35 U.S.C. 154(b) by 0 days.

(21) Appl. No.: 09/609,421

(22) Filed: Jul. 5, 2000

(51) Int. Cl.$^7$ ................................. B60K 6/04
(52) U.S. Cl. ................. 318/138; 318/283; 180/65.2
(58) Field of Search ................... 318/139, 587, 318/140–149; 307/10.5; 192/0.044, 0.076, 0.09, 3.58; 74/191, 661; 290/50, 45; 180/65.2, 65.6, 165, 65.4

(56) References Cited

U.S. PATENT DOCUMENTS

| | | | |
|---|---|---|---|
| 4,393,964 A | * | 7/1983 | Kemper |
| 5,081,365 A | * | 1/1992 | Field et al. |
| 5,343,970 A | * | 9/1994 | Severinsky |
| 5,612,578 A | * | 3/1997 | Drew |
| 5,713,425 A | * | 2/1998 | Buschhaus et al. |
| 6,202,776 B1 | * | 3/2001 | Masberg et al. |
| 6,209,672 B1 | * | 4/2001 | Severinsky |

\* cited by examiner

*Primary Examiner*—Paul Ip
(74) *Attorney, Agent, or Firm*—Larry I. Shelton

(57) ABSTRACT

An engine shut off system for a hybrid electric vehicle includes an internal combustion engine, an electric motor, and a controller. The internal combustion engine is located in the hybrid electric vehicle and is coupled to the electric motor. The vehicle system controller is coupled to the internal combustion engine and may automatically shut off or start the internal combustion engine. When the hybrid electric vehicle is completely stopped the controller shuts the internal combustion engine off after a configurable period of time.

16 Claims, 1 Drawing Sheet

ENGINE SHUT OFF SYSTEM FOR A HYBRID ELECTRIC VEHICLE

TECHNICAL FIELD

The present invention relates generally to hybrid electric vehicle systems and, more particularly, to variable engine shut off system for a hybrid electric vehicle.

BACKGROUND ART

Most of today's motor vehicles carry an internal combustion engine that functions optimally at high speeds only. It is by necessity larger than an engine required for "in town" operation. Therefore a penalty is paid for the luxury of broad range operation, including the deterioration of our environment. Emissions during warm-up, low speed, and idle operations are not negligible. A large engine requires longer warm-up time, and short trips may not achieve warm-up in many cases, increasing the pollution problem There exists, at the moment, much effort in addressing the basic need for an efficient power source at all operating conditions. One such effort, known as series hybrid electric, approaches the problem by carrying an on-board generator, which supplies electrical power to recharge batteries for an electric drive mechanism. This allows for "range extending" at the cost of the additional weight of added components. In this scheme each of the power elements must be individually capable of the peak demands of the vehicle.

Another effort, known as parallel hybrid electric, holds a significant amount of promise. A parallel system allows the output from power components to be added together as required and therefore, each of the power components need only produce a portion of the power required of the series system components. Similarly, each of the power components is substantially lighter than its counterpart in the series hybrid. This reduction in weight also reduces power requirements, necessitating fewer batteries for the same range.

In most hybrid electric vehicle motors, an internal combustion engine is used to run the generator to produce electricity. If the exhaust emissions from the engine when it is operating are maintained at ultra low levels, the actual average emissions from the vehicle can be maintained close to zero since the engine will be shut off during idle, i.e., in city driving, the engine will shut off at every stop. The internal combustion engine can be operated inherently cleaner by being maintained at a constant speed and constant load, independent of the time-varying need for road horsepower. During most city driving it will not operate at idle, i.e., the hybrid electric vehicle will operate in an engine mode and the batteries will be charged continuously by the generator.

Along these lines, many hybrid electric vehicles are equipped with an engine shut off feature. The engine shut off occurs when a hybrid electric vehicle is stopped. This prevents hydrocarbon emissions generated when a normal vehicle is idling. This also helps improve overall fuel economy without intervention from the driver. In many existing systems, the engine shuts off after a predetermined pre-set time when the vehicle comes to a complete stop. To re-start the engine, the operator depresses the throttle pedal and clutch in manual transmission vehicle and releases the brake pedal in the automatic transmission vehicle. Unfortunately, customers in different regions and different countries prefer different engine shut off times.

The disadvantages associated with this conventional engine shut off technique have made it apparent that a new technique for engine shut off for a hybrid electric vehicle is needed. Preferably, the new technique would allow for a configurable shut off time. The new technique should also reduce hydrocarbon emissions generated when a vehicle is stopped while improving overall fuel economy.

SUMMARY OF THE INVENTION

It is an object of the invention to provide an improved and reliable means for engine shut off for a hybrid electric vehicle. Another object of the invention is to allow for a configurable shut off time. An additional object of the invention is to reduce hydrocarbon emissions generated when a vehicle is stopped while improving overall fuel economy.

In accordance with the objects of this invention, a engine shut off system for a hybrid electric vehicle is provided. In one aspect of the invention, an engine shut off system for a hybrid electric vehicle includes an internal combustion engine, an electric motor, and a controller. The internal combustion engine is located in the hybrid electric vehicle and is coupled to the electric motor. The vehicle system controller is coupled to the internal combustion engine and the motor, and may automatically shut off or start the internal combustion engine. When the hybrid electric vehicle is completely stopped the controller shuts the internal combustion engine off after a configurable period of time.

The present invention achieves an improved and reliable means for engine shut off for a hybrid electric vehicle. Also, the present invention is advantageous in that allows the time period before engine shut off occurs to be varied.

Additional advantages and features of the present invention will become apparent from the description that follows, and may be realized by means of the instrumentalities and combinations particularly pointed out in the appended claims, taken in conjunction with the accompanying drawings.

BRIEF DESCRIPTION OF THE DRAWINGS

In order that the invention may be well understood, there will now be described some embodiments thereof, given by way of example, reference being made to the accompanying drawings, in which.

BEST MODE(S) FOR CARRYING OUT THE INVENTION

Figure 1:
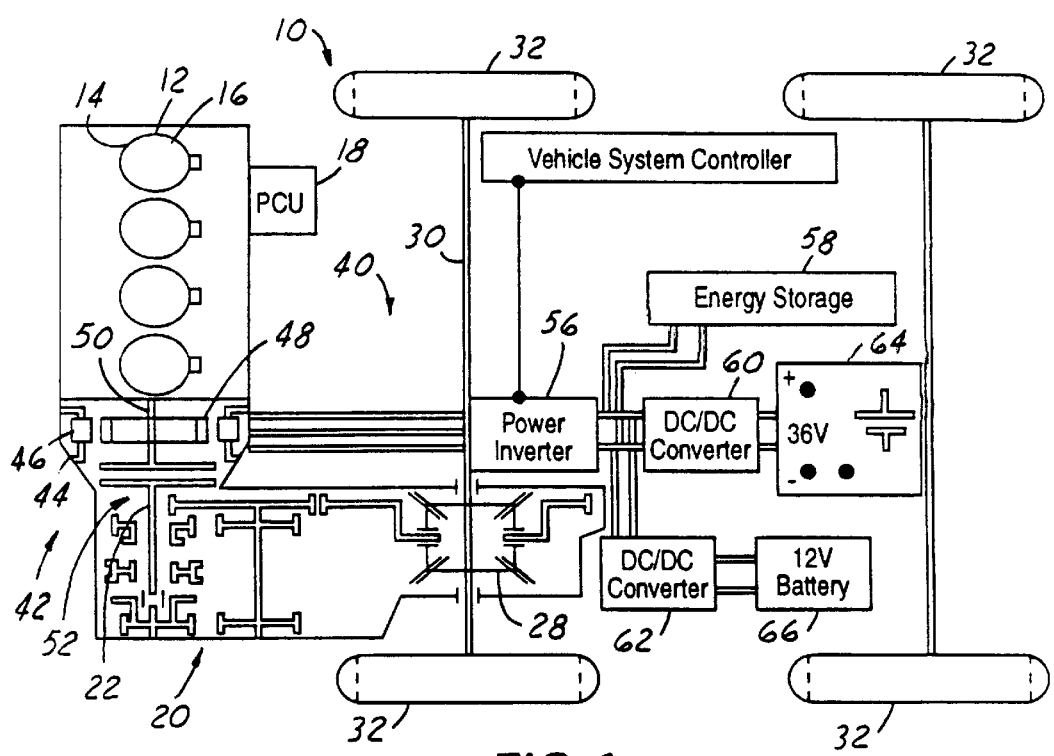
FIG. 1 is a schematic view of a hybrid electric vehicle system having an engine shut off system in accordance with one embodiment of the present invention.

Referring to FIG. 1, an automotive vehicle 10 is illustrated having an internal combustion engine 12 having cylinders 14 with pistons 16 located therein. Each cylinder 14 is coupled to a fuel pump through a fuel injector (not shown) or other fuel delivery system. Each cylinder 14 also has a spark plug 19 or other ignition source coupled to a powertrain control unit 18. Powertrain control unit 18 controls the ignition timing and fuel pump operation in a conventional manner subject to the improvements of the present invention.

Engine 12 is coupled to a transmission 20. Transmission 20 may be automatic, manual or continuously variable. Transmission 20 has a transaxle input shaft 22. Transmission 20 is coupled to a differential 28 to drive an axle 30 to provide power to wheels 32. Of course, the present invention is also applicable to four wheel drive systems in which all of the wheels 32 are driven.

An electric motor system 40 that includes an electric motor 42 and its associated control electronics is coupled to engine 12. In the present invention, electric motor 42 is positioned between housing 44 of transmission 20 and the engine 12. Electric motor 42 has a stator 46 fixedly attached to bell housing 44 and a rotor 48 selectively coupled to a crankshaft 50 of engine 12 and fixedly coupled to transmission 20. A clutch 52 is used to engage and disengage engine 12 from transmission 20. As will be further described below, electric motor 42 is may be used to produce positive and negative tractive force. Clutch 52 allows electric motor 42 to decouple the engine 12 and transmission 20 during stops or idle of engine 12. While the present invention is an illustration of a Low Storage Requirement HEV, one skilled in the are would recognize that the present teachings are applicable to any parallel or power-split HEV.

Electric motor system 40 has a system controller 54 that is coupled to powertrain control unit 18 and to a power inverter 56. In practice, the power inverter 56 and system controller 54 may be contained in a single package. The inverter 56 is used to convert DC power to AC power in the startup mode and AC power to DC power in power generation mode.

Power inverter 56 may be coupled to an energy storage device 58 such as an ultra capacitor, a first DC to DC converter 60, and a second DC to DC converter 62. In the configuration shown, DC to DC converter 60 is coupled to a 36-volt battery 64. DC to DC converter 62 is coupled to a 12-volt battery 66. Of course, the actual battery voltage, the number of storage devices and the number of DC to DC converters are dependent on the particular system to which it is attached.

Many hybrid electric vehicles are equipped with an engine shut off feature. The engine shut off occurs when a hybrid electric vehicle is stopped. This prevents hydrocarbon emissions generated when a normal vehicle is idling. This also helps improve overall fuel economy without intervention from the driver. In many existing systems, the engine shuts off after a predetermined pre-set time when the vehicle comes to a complete stop. To re-start the engine, the operator depresses the throttle pedal and clutch or releases brake pedal and depresses throttle pedal. Unfortunately, customers in different regions and different countries prefer different engine shut off times.

In the present invention, the time to engine shut off can be varied automatically by controller 54 or adjusted manually by an operator. In one preferred embodiment of the present invention, controller 54 includes an adaptive learning system such that the shut off time for engine 12 changes if the driving conditions change from one area to another area. The adaptive learning system would use one or more inputs, such as, number of stops, time to re-start the engine, clutch travel, throttle, electric steering movement, battery state of charge, and speed. The adaptive learning system would also generate one or more outputs, such as, time to shut off engine, power assist if required, and battery charge required. In another embodiment of the present invention, the operator may change the engine shut off time manually to adjust to particular driving conditions.

From the foregoing, it can be seen that there has been brought to the art a new and improved engine shut off system for a hybrid electric vehicle. It is to be understood that the preceding description of the preferred embodiment is merely illustrative of some of the many specific embodiments that represent applications of the principles of the present invention. Clearly, numerous and other arrangements would be evident to those skilled in the art without departing from the scope of the invention as defined by the following claims:

What is claimed is:

1. An engine shut off system for a hybrid electric vehicle comprising:
   an internal combustion engine located in the hybrid electric vehicle;
   an electric motor located in the hybrid electric vehicle and coupled to said internal combustion engine; and
   a vehicle system controller located in the hybrid electric vehicle and coupled to said internal combustion engine, said vehicle system controller receiving one or more inputs from the vehicle which are fed to control logic contained in said controller, said control logic being operative to automatically shut off said internal combustion engine after a configurable period of time based on said one or more inputs when said hybrid electric vehicle is stopped.

2. The engine shut off system for a hybrid electric vehicle as recited in claim 1, wherein one of said inputs used to determine said configurable period of time is based upon a number of stops made by the hybrid electric vehicle.

3. The engine shut off system for hybrid electric vehicle as recited in claim 1, wherein one of said inputs for determining said configurable period of time is based upon a manual setting by an operator.

4. The engine shut off system for a hybrid electric vehicle as recited in claim 1, wherein one of said inputs for determining said configurable period of time is based upon an amount of clutch travel.

5. The engine shut off system for a hybrid electric vehicle as recited in claim 1, wherein one of said inputs for determining said configurable period of time is based upon a throttle position.

6. The engine shut off system for a hybrid electric vehicle as recited in claim 1, wherein one of said inputs for determining said configurable period of time is based upon an electric steering movement.

7. The engine shut off system for a hybrid electric vehicle as recited in claim 1, wherein one of said inputs for determining said configurable period of time is based upon a battery state of charge.

8. The engine shut off system for a hybrid electric vehicle as recited in claim 1, wherein one of said inputs for determining said configurable period of time is based upon vehicle speed.

9. A method for controlling engine shut off for a hybrid electric vehicle, comprising:
   locating an internal combustion engine in the hybrid electric vehicle;
   coupling an electric motor to said internal combustion engine;
   receiving one or more inputs regarding vehicle operation at a vehicle system controller in the hybrid electric vehicle; and
   determining a configurable period of time to shut off the internal combustion engine after the hybrid electric vehicle has been stopped, said period of time being based on one or more of said inputs; and
   automatically shutting off said internal combustion engine based on said determined configurable period of time.

10. The method of claim 9, wherein one of said inputs used to determine said configurable period of time is based upon a number of stops made by the hybrid electric vehicle.

11. The method of claim 9, wherein one of the inputs for determining said configurable period of time is based upon a manual setting by an operator.

12. The method of claim 9, wherein one of said inputs for determining said configurable period of time is based upon an amount of clutch travel.

13. The method of claim 9, wherein one of said inputs for determining said configurable period of time is based upon a throttle position.

14. The method of claim 9, wherein one of said inputs for determining said configurable period of time is based upon an electric steering movement.

15. The method of claim 9, wherein one of said inputs for determining said configurable period of time is based upon a battery state of charge.

16. The method of claim 9, wherein one of said inputs for determining said configurable period of time is based upon vehicle speed.

* * * * *